United States Patent [19]

Brunet et al.

[11] 4,225,280
[45] Sep. 30, 1980

[54] TRAILER FOR TRANSPORTING AND LAUNCHING FLOATING BOX CAISSONS

[75] Inventors: Roger Brunet, La Seyne-sur-Mer; Gerard Marenco, Six-Fours-les-Plages, both of France

[73] Assignee: Constructions Navales et Industrielles de la Mediterranee, La Seyne-sur-Mer, France

[21] Appl. No.: 897,159

[22] Filed: Apr. 17, 1978

[30] Foreign Application Priority Data

Apr. 27, 1977 [FR] France .................. 77 12715

[51] Int. Cl.² .............................................. B60P 1/30
[52] U.S. Cl. ...................... 414/479; 414/523
[58] Field of Search ............. 414/475, 477–480, 414/482, 499, 523, 491, 469

[56] References Cited

U.S. PATENT DOCUMENTS

| 2,621,814 | 12/1952 | Lisota | 414/477 |
|---|---|---|---|
| 2,786,590 | 3/1957 | Edwards | 414/477 |
| 2,821,315 | 1/1958 | Bucher | 414/477 |
| 2,830,717 | 4/1958 | Posey | 414/479 |
| 2,954,887 | 10/1960 | Compagnari | 414/480 |
| 3,430,792 | 3/1969 | Grove | 414/477 |
| 3,485,400 | 12/1969 | Pewthers | 414/477 |
| 3,989,266 | 11/1976 | Foster | 414/349 |

Primary Examiner—Stephen G. Kunin
Assistant Examiner—Terrance L. Siemens
Attorney, Agent, or Firm—Wenderoth, Lind & Ponack

[57] ABSTRACT

A trailer for transporting, launching and retrieving floating box caissons includes a conventional road chassis, a tip-frame pivoted to the rear end of the road chassis and provided with a system for tipping the tip-frame from a normal horizontal position, and a sub-frame slidably mounted in the tip-frame and provided with a system for causing longitudinal translation of the sub-frame in relation to the tip-frame. A hauling carriage is guided for movement within the sliding sub-frame. A system is provided for moving the hauling carriage in translation within the sliding sub-frame. A lock is mounted on the hauling carriage for rigidly coupling a floating box-caisson to the carriage.

3 Claims, 6 Drawing Figures

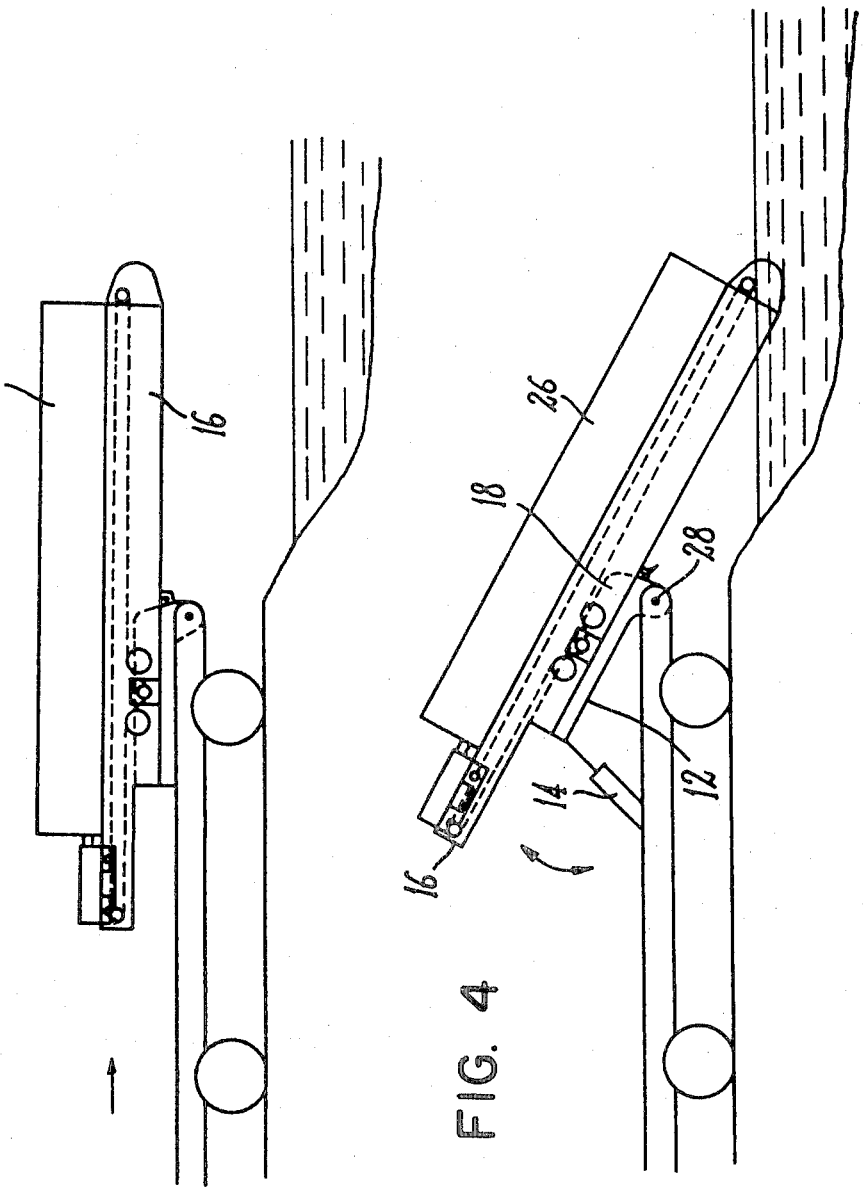

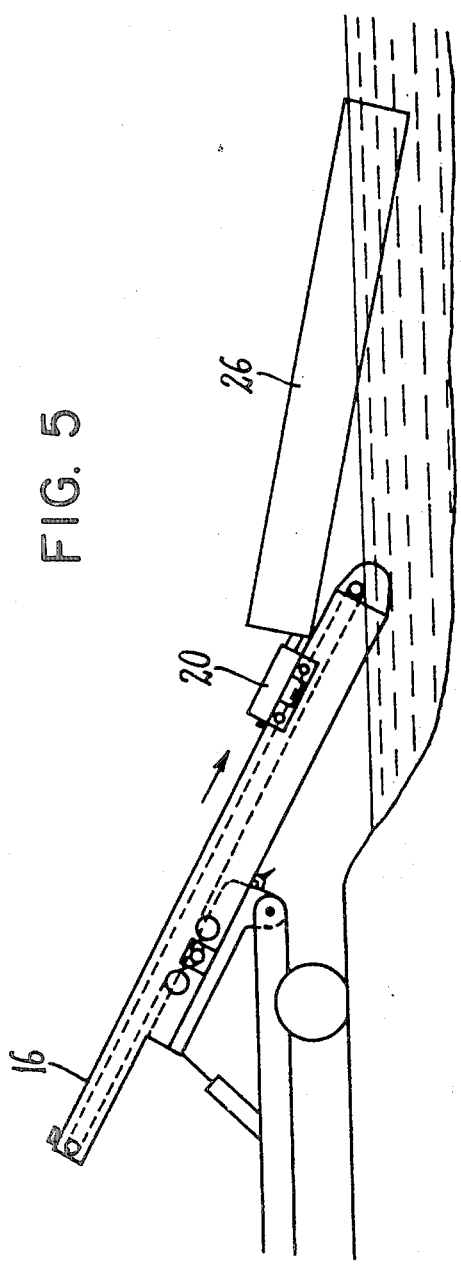
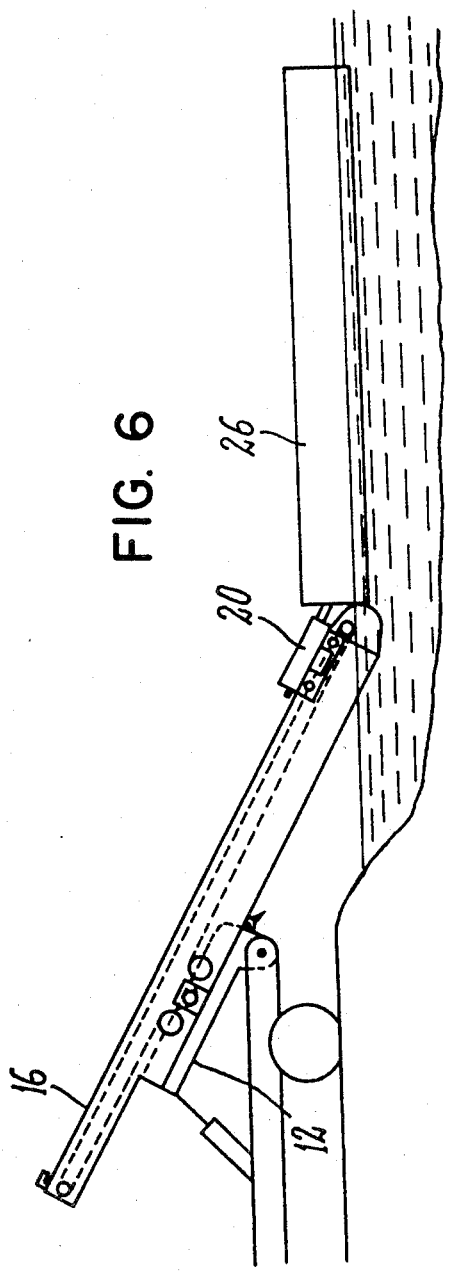

TRAILER FOR TRANSPORTING AND LAUNCHING FLOATING BOX CAISSONS

BACKGROUND AND SUMMARY OF THE INVENTION

The present invention relates to a trailer designed for performing the following duties: transporting on ordinary or bad roads a floating box caisson, smoothly and completely launching the floating box-caisson, even in a strong-current water-course, and retrieving the caisson floating on water for re-installing the same on the trailer for transporting the caisson to another site, this last-mentioned operation being also performed when the caisson is floating in a strong-current water-course. All these operations are performed by using only equipment provided on the trailer.

A trailer according to this invention has a conventional road chassis of relatively simple design, and is characterized in that it comprises a tip-frame hingedly mounted to the rear edge of the road chassis and provided with means for causing the tip-frame to be tipped from its normal horizontal position to a more or less inclined position. A sub-frame is slidably mounted in the tip-frame and is provided with means for causing its longitudinal movements of translation in relation to the tip-frame. A hauling carriage is provided with means for guiding the same for movement within the sliding sub-frame. A system is provided for causing the carriage to move in the sliding sub-frame. A lock is mounted on the hauling carriage for interlocking the caisson and carriage assembly.

According to a specific feature characterizing this invention the means for tipping the tip-frame from its normal horizontal position comprise fluidactuated cylinders interposed between the road chassis and the tip-frame.

According to a further feature characterizing this invention, the means for moving the sliding sub-frame in translation with respect to the tip-frame comprise an endless chain system driven from a hydraulic motor. According to this invention, the same endless chain system may be used for controlling the longitudinal movements of translation of the hauling carriage.

BRIEF DESCRIPTION OF THE DRAWINGS

Other features and advantages characterizing this invention will appear as the following description proceeds with reference to the accompanying drawings illustrating diagrammatically by way of example a typical embodiment thereof, and wherein:

FIGS. 2 to 6 are simplified views similar to FIG. 1 showing on a smaller scale the various successive steps required for launching a floating box caisson.

DETAILED DESCRIPTION OF THE INVENTION

Figure 1:
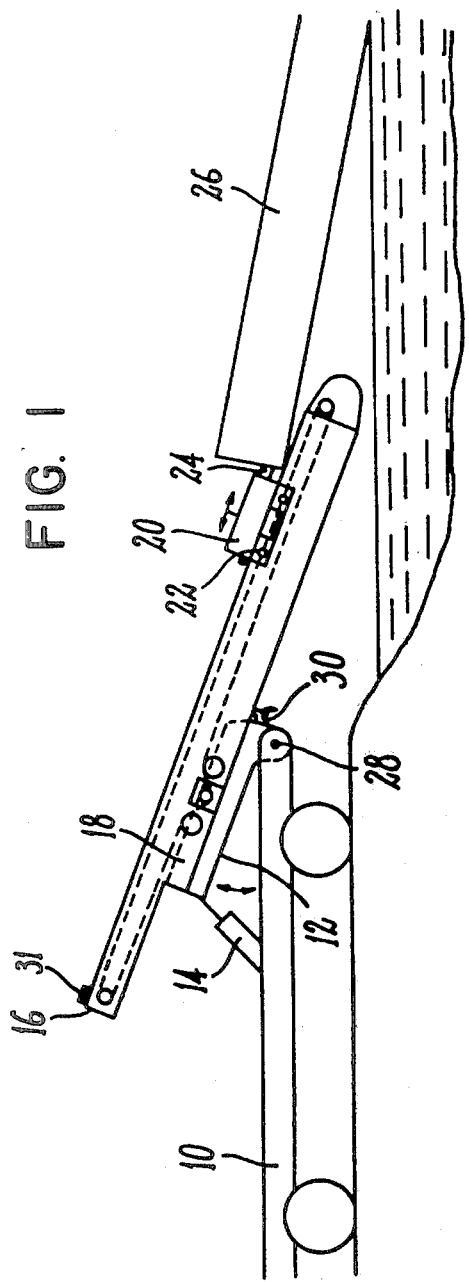
FIG. 1 is a diagrammatical, side-elevational view of the trailer according to this invention, shown during the launching of a floating box caisson.

Referring to FIG. 1, it will be seen that the trailer according to this invention, which is of the type adapted to be towed by a tractor or other vehicle, comprises essentially the following component elements:

(a) a conventional road chassis 10 of relatively simple structure, provided with a front saddle and a rear axle, and constituting the road section of the trailer;

(b) a tip-frame 12 hingedly mounted by means of horizontal transverse pivot means 28 to the rear end of the road chassis 10 and adapted to be tipped to an angle of about 45° to the horizontal when fluid-actuated cylinders 14 interposed between the road chassis 10 and the tip-frame 12 are operated;

(c) a sliding sub-frame 16 mounted within the tip-frame 12 and adapted to be moved for translation in relation to the tip-frame along a path of about five meters. This movement of translation, in the embodiment illustrated, is obtained by means of an endless system 18 driven from a hydraulic motor (not shown);

(d) a hauling carriage 20 is guided by means of rollers 22 for movement along rails (not shown) disposed within the sliding sub-frame 16. In the example illustrated, this movement is obtained by means of the endless chain system 18 controlling the movements of the sliding sub-frame 16. Furthermore, the hauling carriage 20 is provided with means 24 for locking the box-caisson 26 to the trailer. These hand-controlled means 24 may for example be of the conventional hook and bolt type. The carriage is released manually at the end of the launching operation when it is desired to free the floating box caisson 26 from the trailer. In the transport position, caisson 26 is locked to the hauling carriage 20.

Now the various steps required for launching a floating box caisson carried by the trailer of this invention will be described with reference to FIGS. 2 to 6 of the drawing.

The trailer according to this invention (FIG. 2) towed by a conventional tractor or other vehicle is driven to the launching site, and the tractor and trailer assembly is backed as close as possible to the water surface as a function of the type or nature of the bank. If the bank has a very moderate inclination, or if the ground is slightly boggy, the trailer may be backed until its rear axle is more or less immersed in the water.

Then the sliding sub-frame 16 supporting the caisson 26 is moved in translation (FIG. 3) by actuating the endless chain system 18 driven from a hydraulic motor (not shown), until sub-frame 16 is stopped by a mechanical stop or lock 30, the position of which is determined to bring the centre of gravity of the movable assembly as close as possible to the tip point.

The next step (FIG. 4) consists in tipping the tip-frame 12 about the horizontal transverse hinge axis 28 at the rear end of the trailer. This tip movement is obtained by actuating hydraulic cylinders 14. The inclination assumed by the tip-frame in relation to the horizontal is adjusted as a function of the type of banks to be dealt with. Preferably the rear end of the sliding sub-frame 16 should be at a height of about 20 centimeters above the water surface.

By properly actuating the endless chain system 18 the hauling carriage 20 (FIG. 5) is lowered and consequently the box caisson 26 rigid therewith is also lowered and guided within the sliding sub-frame 16 by means of the above-mentioned roller and rail system (FIG. 1), thus holding the box-caisson in the transverse direction during its downward movement. When the end of the box caisson 26 engages the water surface, the buoyancy acting on this end tends to separate the caisson 26 from the sliding sub-frame 16, since the caisson is attached only by its front end to the hauling carriage 20.

When the hauling carriage 20 engages a mechanical stop element provided at the rear end of the sliding sub-frame 16, the box caisson 26 is definitely afloat (FIG. 6) but still connected to the trailer through the lock means 24 provided on the carriage 20. This connection, notably in case of strong current, is suitable to permit the adaptation of an anchorage or propulsion means that shall be required when the caisson will have to be handled or retained on the water surface.

After completing the anchorage or propulsion operations required for the box caisson concerned, the latter can eventually be released from the trailer, the lock means 24 being controlled from the top of the caisson.

Now the successive operations necessary for re-loading the trailer with the floating box caisson 26 will be described. In fact, these operations are substantially the same as those described hereinabove in connection with the launching of the box caisson, but are performed in the reverse order.

The empty trailer is brought close to the shore, substantially as shown in FIG. 6, i.e. with the sliding subframe 16 in its rearmost position, the tip-frame 12 raised and the hauling carriage 20 close to the water level. By autonomous or external propulsion, the floating box caisson 26 is brought as close as possible to the hauling carriage 20. The lock means 24 provided on carriage 20 are actuated to lock automatically the adjacent end of the floating box caisson 26 to the rear end of the hauling carriage 20, this locking action being obtained even in case of very approximate approach of the two elements to be coupled.

Then the propulsion means of the floating box caisson may be disconnected so that the stress resulting from any current in the water stream is transmitted to the trailer structure. Under these conditions, the re-loading of the box caisson 26 on the trailer may begin.

By actuating the endless chain system 18, the hauling carriage 20 and therefore the box caisson 26 carried thereby are moved up the sliding subframe 16 (FIG. 5) until the carriage engages a stop or lock 31 provided for this purpose at the upper or front end of the sub-frame 16.

Figure 2:
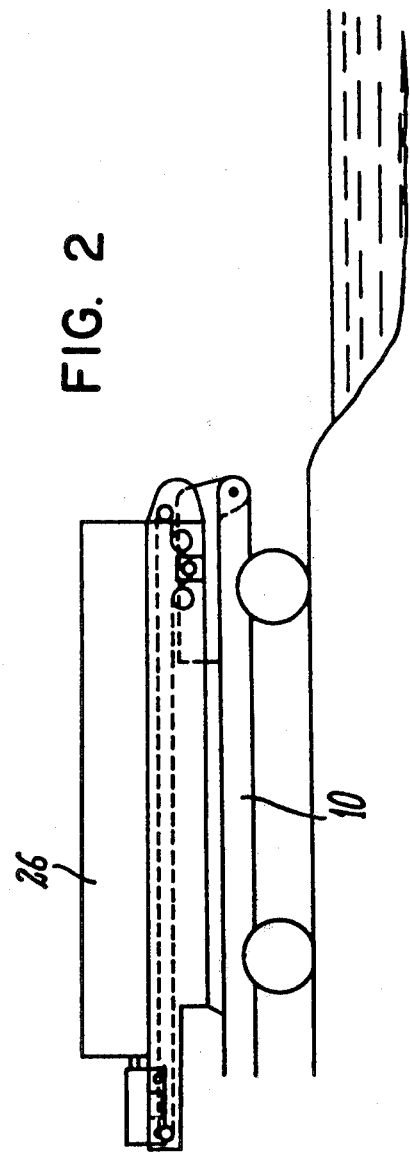

Subsequently, the tip-frame 12 is tilted back to the horizontal by actuating first the cylinders 14 (FIG. 4) and then the endless chain system 18, in order to cause the forward translation of the sliding sub-frame 16 until the component elements resume their original transport position illustrated in FIG. 2.

From the above description it is clear that all the operations involved are performed by using only equipment provided on the trailer according to the invention.

The caisson launching and re-loading operations may be performed irrespective of the type of bank or shore from which they are to take place, whether a smooth, moderately-inclined beach or a pier lying six feet above the water-level are concerned.

Of course, this invention should not be construed as being strictly limited by the specific embodiment described and illustrated herein, since it also includes all modifications and changes brought thereto within the scope of the invention. Thus, notably, the means contemplated for launching floating box caissons may also constitute a fixed equipment installed adjacent a water surface of any type. What is claimed as new is:

1. A trailer for transporting, launching and retrieving floating box caissons, said trailer comprising:
   a conventional road chassis;
   a tip frame mounted above said chassis and pivotally connected about a pivot to the rear end of said chassis;
   means for pivoting said tip frame about said pivot from a first, horizontal position to a second, inclined position;
   a sub-frame slidably mounted on said tip frame and movable therealong between a first, forward position and a second, rearward position;
   a hauling carriage slidably mounted on said sub-frame and movable therealong between a first, forward position and a second, rearward position;
   means, associated with said tip frame, said sub-frame and said hauling carriage, for moving said sub-frame between said first and second positions thereof with respect to said tip frame and for moving said hauling carriage between said first and second positions thereof with respect to said sub-frame; and
   lock means, mounted on a rear end of said hauling carriage, for locking engagement to a floating box caisson, such that movement of said hauling carriage between said first and second positions thereof moves the floating box caisson along the top of said sub-frame.

2. A trailer as claimed in claim 1, wherein said pivoting means comprises hydraulic cylinders interposed between said chassis and said tip frame.

3. A trailer as claimed in claim 1, wherein said moving means comprises an endless chain system.

* * * * *